US012287895B2

(12) United States Patent
Chandrashekhar

(10) Patent No.: US 12,287,895 B2
(45) Date of Patent: Apr. 29, 2025

(54) ENHANCED DATA SECURITY AND ACCESS CONTROL USING MACHINE LEARNING

(71) Applicant: Alcon Inc., Fribourg (CH)

(72) Inventor: Uma Chandrashekhar, Tabuco Canyon, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 18/466,119

(22) Filed: Sep. 13, 2023

(65) Prior Publication Data
US 2023/0418967 A1 Dec. 28, 2023

Related U.S. Application Data

(62) Division of application No. 17/103,581, filed on Nov. 24, 2020, now Pat. No. 11,797,700.

(60) Provisional application No. 62/943,071, filed on Dec. 3, 2019.

(51) Int. Cl.
G06F 21/55 (2013.01)
G06F 21/31 (2013.01)
G06F 21/60 (2013.01)
G06F 21/62 (2013.01)
G06N 20/20 (2019.01)
H04L 9/40 (2022.01)

(52) U.S. Cl.
CPC ........ G06F 21/6218 (2013.01); G06F 21/604 (2013.01); G06N 20/20 (2019.01)

(58) Field of Classification Search
CPC .. G06F 21/6218; G06F 21/604; G06F 21/552; G06F 21/316; G06F 21/6272; G06N 20/20; H04L 63/102
See application file for complete search history.

(56) References Cited

U.S. PATENT DOCUMENTS

| 7,213,258 B1* | 5/2007 | Kesarwani | G06F 16/972 |
| | | | 705/42 |
| 2016/0267283 A1 | 9/2016 | Takaai | |
| 2018/0247241 A1* | 8/2018 | Avrahami | G06Q 10/06316 |
| 2018/0285839 A1* | 10/2018 | Yang | G06Q 20/40 |
| 2019/0258818 A1* | 8/2019 | Yu | G06F 21/44 |
| 2019/0327271 A1* | 10/2019 | Saxena | G06F 8/38 |
| 2019/0354718 A1* | 11/2019 | Chandnani | G06F 21/6254 |
| 2020/0053090 A1* | 2/2020 | Kliger | H04L 63/107 |

FOREIGN PATENT DOCUMENTS

| JP | 2016162298 A | 9/2016 |
| JP | 2016167206 A | 9/2016 |
| JP | 2019128916 A | 8/2019 |

* cited by examiner

*Primary Examiner* — Joseph P Hirl
*Assistant Examiner* — Aayush Aryal

(57) ABSTRACT

Techniques for controlling data access using machine learning are provided. In one aspect, first, second, and third training data sets are generated from a set of historical access records and a set of historical data records, where the access records correspond to requests for data and comprise information identifying whether the request satisfies one or more data access rules, and the data records correspond to data elements and comprise information identifying whether the data element satisfies the one or more data access rules. One or more machine learning models are trained based on the first, second, and third training data sets to generate an output identifying whether requests for data should be granted.

17 Claims, 10 Drawing Sheets

ENHANCED DATA SECURITY AND ACCESS CONTROL USING MACHINE LEARNING

INTRODUCTION

Aspects of the present disclosure relate to data access and security, and more specifically to using machine learning to drive data visibility, control, access, and security decisions.

BACKGROUND

A wide variety of global systems have been used to collect and store data about any number of data subjects, such as patients, users, or any other individual or entity described by the processed and stored data. For example, healthcare data is often maintained for each patient of a given facility. This can include any number and variety of data elements, such as diagnoses, genetic information, clinical notes, medications the patient is on (or was previously prescribed), surgical in-patient or out-patient operations or other procedures that have been performed or are recommended, and the like. Generally, this data is subject to a variety of protections and requirements relating to data security and user privacy. However, there are many instances when access to the data would be beneficial to the data subject or others, without causing any harm to the data subject or violating their privacy.

Existing systems generally make data access difficult, and create significant confusion as to which data elements are (or may be) exposed and which are protected. In many fields (such as the medical field), data access and security is controlled largely by a variety of technologies that leave no flexibility and little predictability as to what elements of data can be shared, even in circumstances where the sharing may be beneficial to others. For example, in certain cases, a patient may unfortunately pass away due to complications or underlying medical conditions. During the life of the patient, healthcare data such as genetic information and diagnosis may have been collected and correlated. Such information may, for example, be beneficial to living relatives of the patient, such as to determine if they also have genetic markers that may predispose them for the same condition. If the relatives were able to get access to such information, it may help them address the condition earlier and improve quality of life. However, current systems may be so rigid that relatives cannot access such information as they do not have the patient consent and further at this stage, unfortunately that cannot be obtained.

In other industries, partners and competitors alike fear losing proprietary knowledge, and generally prevent data access entirely despite the missed opportunities for innovation and growth. At a high level, this can negatively affect the progress of innovation in society as valuable data that may be used by others to advance innovations are not available generally due to restriction on access without consideration of the effect such restriction has. Thus, there is a need for a flexible and intelligent system to more finely control data access as an alternative to the existing binary framework of all or nothing data disclosure.

BRIEF SUMMARY

Certain embodiments provide a method for using one or more machine learning models to automatically control data access. The method generally includes receiving, from a first user, a first request for data relating to a second user; automatically determining whether the first request satisfies one or more data access rules by processing the first request using a first set of one or more trained machine learning models; upon determining that the first request satisfies the one or more data access rules, automatically retrieving a first plurality of data elements based on the first request; automatically determining whether each of the first plurality of data elements satisfies the one or more data access rules by processing each of the first plurality of data elements using a second set of one or more trained machine learning models; upon determining that a first set of data elements, from the first plurality of data elements, satisfies the one or more data access rules, determining whether the first set of data elements satisfies the one or more data access rules by processing the first set of data elements using a third set of one or more trained machine learning models; and upon determining that the first set of data elements satisfy the one or more data access rules, generating a custom report including the first set of data elements.

Certain embodiments provide a method for training one or more machine learning models to control data accessibility. The method generally includes generating a first training data set from a set of historical access records, wherein each respective access record in the first training data set corresponds to a respective request for data and comprises information identifying whether the respective request satisfies one or more data access rules; generating a second training data set from a set of data records, wherein each respective data record in the second training data set corresponds to a respective data element and comprises information identifying whether the respective data element satisfies the one or more data access rules; generating a third training data set from the set of historical access records, wherein each respective access record in the third training data set corresponds to a respective set of aggregated data elements and comprises information identifying whether the respective set of aggregated data elements satisfies the one or more data access rules; training the one or more machine learning models based on the first, second, and third training data sets to generate an output identifying whether requests for data should be granted; and deploying the one or more machine learning models to one or more computing systems.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
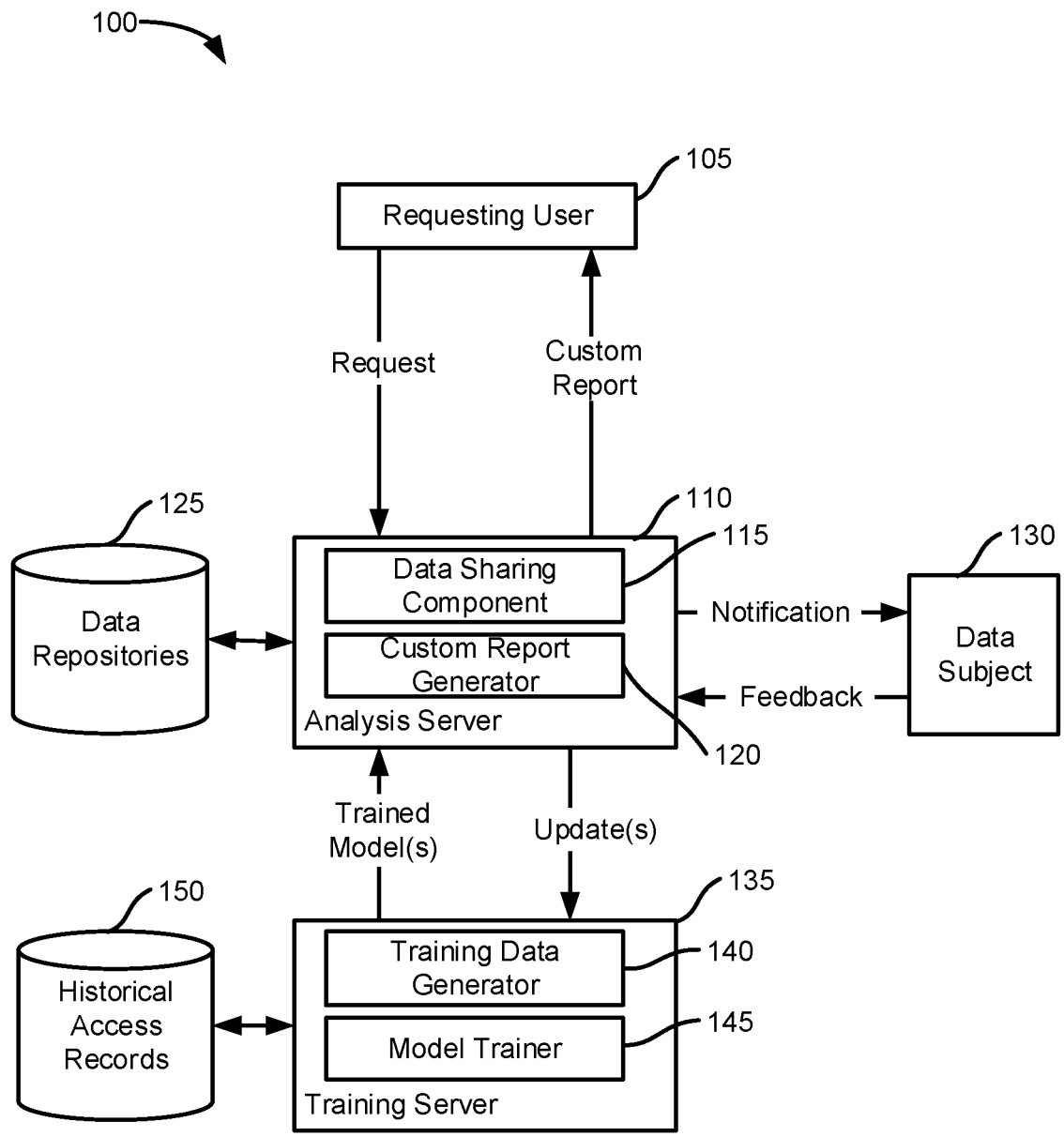
FIG. 1 depicts an environment including an analysis server configured to control data access using machine learning, according to some embodiments disclosed herein.

Embodiments of the present disclosure provide techniques for effective data access control that ensures data privacy and security is maintained while also enabling flexible access when doing so is beneficial without corresponding harm. Advantageously, such systems are able to automatically provide access to valuable data in a defined manner such that data that can benefit from being shared is shared, while sharing of data that could cause harm (e.g., by identifying a particular individual leading to privacy issues) is not performed. Such fine-tuned sharing of data is simply not possible with existing methods that utilize an all or nothing approach to data sharing. For example, based on the shear amount of data collected by existing systems, current mechanisms for manually determining what data to share do not make it practically feasible to provide the level of flexibility of data sharing discussed herein. Accordingly, such manual mechanism may err on the side of caution and overly restrict access to data by not sharing most data.

In some embodiments, to enable such flexible data sharing, defined access rules are utilized to evaluate data requests and data elements at multiple tiers or steps (e.g., evaluating the request alone, evaluating each individual data element, and evaluating the aggregated data elements) before providing (or refraining from providing) any data. In some embodiments, a set of one or more machine learning models are trained to categorize requests and data elements based on such access rules. In doing so, embodiments of the present disclosure allow for rapid evaluation and response to data requests, while maintaining data security. Additionally, because the system utilizes objective models to evaluate requests (while current systems rely on subjective decisions), data integrity is assured.

In some embodiments, a set of access rules are utilized to drive data access decisions. In some embodiments, there may be any number of access rules in a given deployment. In some embodiments, the system can utilize a base set of access rules in an industry-agnostic manner, and allow additional rules to be added or modified based on the particular requirements and desires for a given industry or deployment. In some embodiments, the access rules are used to control data access during an initial manual phase, and the decisions made based on the rules (e.g., by a subject matter expert or other user) are used to train machine learning models to provide the analysis automatically. That is, during what is referred to above as the initial manual phase, a human reviewer may evaluate requests and data elements in view of the access rules in order to determine whether the request should be granted and/or the data should be shared. These manual decisions may be stored in records that include the details of the request and/or data and are labeled with the human decision. Such records may be used by machine learning algorithms to train machine learning models to automatically perform similar analysis.

In some embodiments, the access rules (and, therefore, the models trained based on the access rules) are used to ensure data can be shared when access is considered beneficial while preserving privacy and security. In some embodiments, the system uses a set of three rules: a first access rule specifying that the data, if provided, can only be used to improve humanity or society (without harming the data subject), a second access rule specifying that the requesting entity must have legitimate intent for the data, and a third access rule specifying that the data must remain protected and secured to the extent possible without conflicting with the other rules. Based on this framework, models can be trained to effectively provide a dynamic data access system that allows and restricts access to data in an intelligent and flexible way while abiding by the access rules.

FIG. 1 depicts an environment 100 including an analysis server 110 configured to control data access using machine learning, according to some embodiments disclosed herein. In the illustrated embodiment, a requesting user 105 can provide a request to the analysis server 110. This request generally identifies at least the data that is requested, as well as the intended use for the data. In some embodiments, the request includes metadata or other additional data that is used to identify the requesting user 105, or provide other additional information to give context to the request. In some embodiments, the request is associated with a requestor profile specifying, for example, the identity of the requesting user 105 (e.g., their name or other identifying information), a reason or purpose for the request, a timeline of when the data is needed, or any additional documentation to supplement or provide context to the request.

For example, suppose a user wishes to determine whether they are at increased risk for a particular disorder, such as deep vein thrombosis (DVT), based on their family history. In some embodiments, the user (acting as the requesting user 105) can provide a request, directly or via another device such as through a network, to the analysis server 110 that includes this information. The analysis server 110 can be any suitable server in any suitable environment (e.g., on premises, associated with an entity, in the cloud, etc.). In some embodiments, the request specifically identifies one or more data subjects. For example, the requesting user 105 may identify their family members as the data subjects (e.g., "does anybody in my family have a history of DVT?"). In another embodiment, the analysis server 110 evaluates the request to identify the relevant data subjects. For example, based on the request (e.g., "do I have a heightened genetic risk for DVT?"), the system may determine that the relevant data subjects are relatives of the requesting user 105. This may be accomplished, for example, using natural language processing (NLP).

Additionally, in some embodiments, the request specifically identifies the desired data elements (e.g., identifying the particular reports, tests, or other elements of data). In another embodiment, the analysis server 110 identifies relevant data elements based on analyzing the request using NLP or other techniques.

In the illustrated environment 100, the analysis server 110 includes a data sharing component 115 and a custom report generator 120. The data sharing component 115 generally evaluates requests to determine whether they should be granted (in full or in part) based on a set of access rules as discussed herein, and additionally identifies, retrieves, and evaluates the relevant data elements to determine whether they should be provided to the data requester based on the same set of access rules as discussed herein. In some embodiments, the data sharing component 115 evaluates requests and data in three tiers: a first tier to evaluate the request in view of the access rules, a second tier to evaluate each individual data element in view of the access rules, and a third tier to evaluate the aggregate set of data elements in view of the access rules. Only data elements which pass all tiers are included in the final report. The custom report generator 120 generally constructs a custom report for the requesting user 105. This custom report may include any data elements that were approved for sharing by the data sharing component. In some embodiments, the custom report can further include a reason for why any portions of the request (or the entire request) were denied or why any data was excluded, as discussed in more detail below. Although the data sharing component 115 and custom report generator 120 are illustrated as discrete components for conceptual clarity, in embodiments, the operations may be combined or distributed across any number of components and devices.

In some embodiments, the data sharing component 115 can initially evaluate the request in order to determine whether it should be denied outright, such as based on the defined access rules. This may be referred to as "tier one" in some embodiments described herein. For example, the data sharing component 115 may determine whether allowing access to the requested data would improve humanity without harming the data subject, whether the request is guided by legitimate intent, whether the data will remain protected, and the like, as specified in the access rules. In some embodiments, the data sharing component 115 does so using one or more trained models as discussed in more detail below. For example, the data sharing component 115 may extract features of the request and process them using one or more model(s) trained based on labeled access data from prior requests, as further discussed herein. Such features may include, without limitation, the identity of the requesting user 105 and/or the data subject(s), the relationship between them, the indicated purpose for requesting the data (which may be explicitly stated, or may be determined based on processing the request using, e.g., NLP), and the like.

If the data sharing component 115 determines that the request should be denied (e.g., because the requesting user 105 intends to commercially exploit the data for advertising purposes, which is not a legitimate use that improves humanity), the data sharing component 115 can reject the request. The custom report generator 120 can then generate a report indicating that the request is denied, and include the determined reasons (e.g., indicating which access rule was failed).

In some embodiments, if the data sharing component 115 determines that the request satisfies the access rules (e.g., using the trained models), the data sharing component 115 can begin the second tier of analysis by identifying the relevant data elements and retrieving them from one or more data repositories 125. For example, the data sharing component 115 identifies the data repositories 125 where the data may be contained. The data repositories 125 may be identified, for example, based on the identity of the requesting user 105, the identity of the data subject(s), the nature or context of the request (e.g., the particular type of data that is requested), and the like. The data sharing component 115 can then transmit a query to each identified repository to retrieve the relevant data.

In some embodiments, the data sharing component 115 then evaluates each individual data element based on the access rules (e.g., using one or more trained models). In embodiments, the data sharing component 115 may utilize the same model(s) used to evaluate the request, or may use a different set of model(s) trained to evaluate data elements. For each individual data element, if the data sharing component 115 determines that the data element satisfies the access rules, the data sharing component 115 can add it to a set of data elements that the requesting user 105 will potentially be granted access to. For any data that fails, the data sharing component 115 can refrain from disclosing it. In some embodiments, the custom report generator 120 will include the reason for why a particular data element was excluded.

If multiple data elements are determined to satisfy the criteria, in some embodiments, the data sharing component 115 can then evaluate the multiple data elements in aggregate to determine whether it should, in the aggregate, be shared. For example, a set of data elements may individually satisfy the rules (e.g., because they are being used to improve humanity without identifying or harming the data subject), but the data elements, when evaluated collectively, may fail (e.g., because they can collectively be used to identify and/or harm the data subject). For example, each of gender, date of birth, and place of work alone may not individually be sufficient to identify a data subject as there are a number of data subjects that individually match such definitions, but collectively, such information may only pertain to a small group or even a single data subject.

In some embodiments, based on the evaluation of the data sharing component 115, the custom report generator 120 then generates and returns a custom report to the requesting user 105. In some embodiments, the custom report generator 120 can additionally provide a notification to the data subject(s) 130, indicating what data was shared. In some embodiments, the notification further indicates the reason or purpose for the request, the identity of the requesting user 105, and the like. In certain embodiments, the notification can additionally indicate any data elements that were withheld.

In the illustrated embodiment, the data subject 130 can provide feedback relating to this data access to the analysis server 110. For example, the data subject 130 may indicate that they do not wish one or more particular data elements to be shared, or that one or more data elements which were withheld should nevertheless be shared. In some embodiments, the system can refine the trained model(s) based on this feedback.

In the illustrated embodiment, the data sharing component 115 utilizes trained models provided by a training server 135. Although depicted as a separate server for conceptual clarity, in some embodiments, the training server 135 and analysis server 110 may operate as a single server. That is, the models may be trained and used by a single server, or may be trained by one or more servers and deployed for use on one or more other servers.

As illustrated, the training server 135 includes a training data generator 140 and model trainer 145. Although depicted as discrete components for conceptual clarity, in some embodiments, the operations of the training data generator 140 and model trainer 145 may be combined or distributed across any number of components and devices.

The training data generator 140 generally uses historical access records 150 to generate training data sets to be used by the model trainer 145 to train one or more machine learning models. In some embodiments, the historical access records 150 relate to prior decisions on data sharing. For example, each record in the historical access records 150 may correspond to a particular request, and the record may indicate whether the request was granted. In some embodiments, for each denied request, the corresponding record can also indicate why the request was denied. In some embodiments, for each approved request, the corresponding record can indicate the relevant data elements, whether each individual data element was approved for release, whether the aggregated data set was approved, and the like.

In some embodiments, the training data generator 140 generates separate training data sets for each model that will be trained. For example, the model trainer 145 may train separate models for each tier of analysis: a first set of one or more models to evaluate whether a request satisfies the access rules, a second set of one or more models to evaluate whether each individual data element satisfies the access rules, and a third set of one or more models to evaluate whether aggregated data elements satisfy the access rules. Similarly, for each tier, the model trainer 145 may train a separate model for each access rule. For example, the model trainer 145 may train a first model to determine whether a request satisfies a first rule (e.g., whether the request will benefit humanity), a second model to determine whether the request satisfies a second access rule, and a third model to determine whether the request satisfies a second access rule. Similarly, the model trainer 145 may train a first model to determine whether an individual data element satisfies the same first rule, a second model to determine whether the individual data element satisfies a second access rule, and a third model to determine whether the individual data element satisfies a third access rule. Also, the model trainer 145 may train a third model to determine whether aggregated data elements satisfy the first rule, a second model to determine whether the aggregated data elements satisfy a second access rule, and a third model to determine whether the aggregated data elements satisfy a third access rule In some embodiments, the generated training data set can differ based on the target model. For example, to train model(s) for the request tier of analysis, the training data generator 140 can generate a data set from the historical access records 150 where each training record specifies input features that are aspects of the request (e.g., the determined reason, the identity of the requestor, and the like) and a corresponding label that indicates whether the request satisfied the access rules and was, therefore, approved (or whether it was determined to pass or fail each individual data access rule). For example, a human user may evaluate requests in order to determine whether they satisfy the access rules. The request data (or metadata) can then be recorded along with the user's decision as an example of labeling. For the individual data element tier, the training data generator 140 can generate a set of data records where each record corresponds to a particular data element that was previously requested and/or shared, and each record specifies input features relating characteristics of the data element (e.g., the field it relates to, a predefined privacy level, relevant regulations, and the like) as well as a label indicating whether allowing access to the data element was determined to satisfy the access rules.

In the illustrated embodiment, the model trainer 145 uses the generated training data sets to train a set of model(s). Generally, training each model includes, for one or more training records, providing the indicated input feature(s) as input to the model (which may be initiated with random parameters). The generated output is then compared to the label of the training record, and the model trainer 145 can compute a loss based on the difference between the generated output and the provided label. This loss can then be used to modify the internal parameters or weights of the model (e.g., via backpropagation). By iteratively processing each training record, the model is iteratively refined to generate accurate access decisions based on input features.

As illustrated, the training server 135 deploys theses trained model(s) to the analysis server 110 for use during runtime. In some embodiments, the training server 135 also receives update(s) from the analysis server 110 (e.g., in the form of feedback from data subjects or subject matter experts). These updates may be used to refine the model(s) further.

Figure 2:
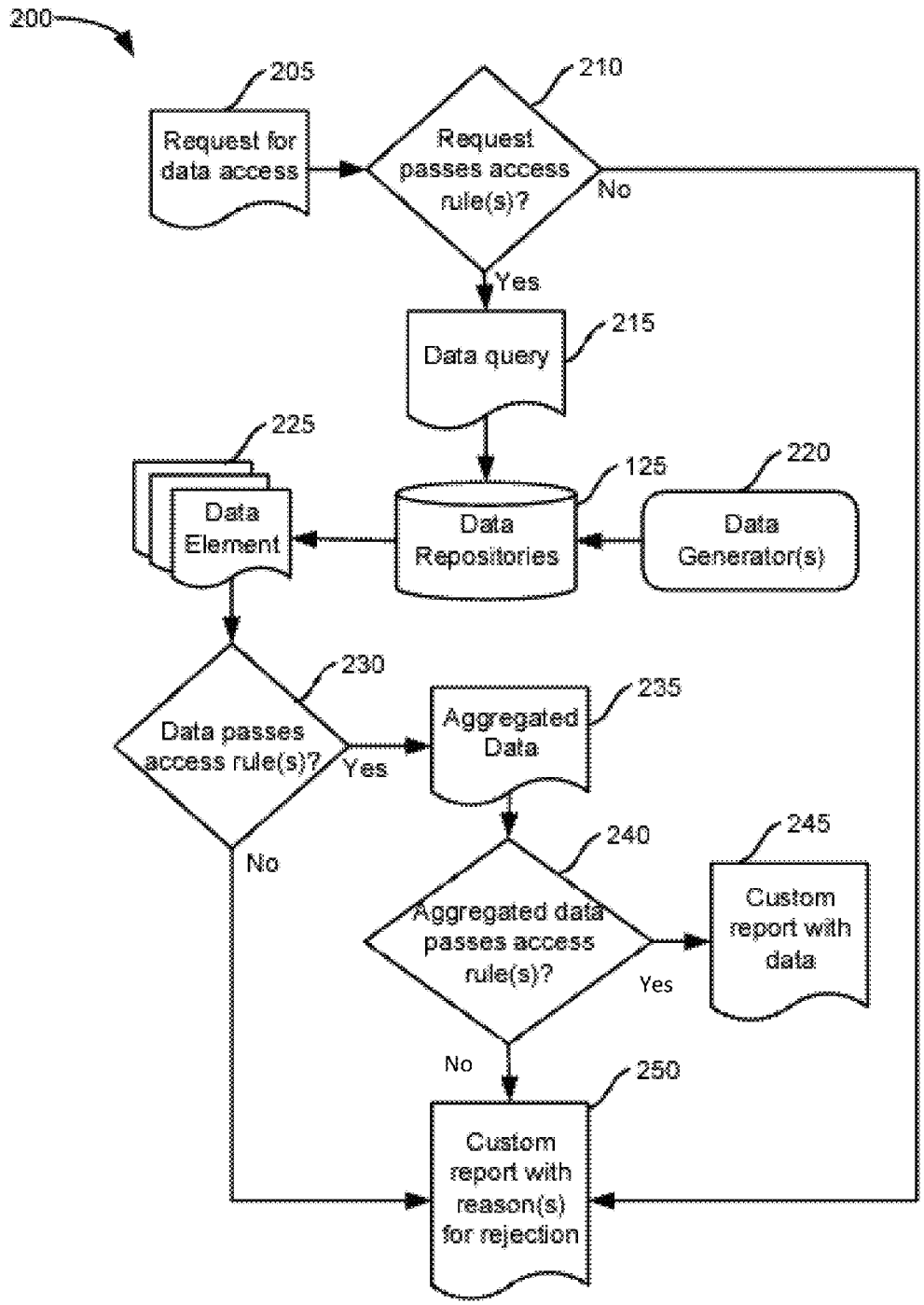
FIG. 2 depicts a workflow for controlling data access using a variety of access rules, according to some embodiments disclosed herein.

FIG. 2 depicts a workflow 200 for controlling data access using a variety of access rules, according to some embodiments disclosed herein. The workflow 200 begins when a request 205 is received. The request generally indicates or identifies the data that is desired. This indication may be of any specificity, including specifying particular data elements (e.g., identifying a specific record), identifying types of data (e.g., "test results"), indicating what content is desired (e.g., "records relating to DVT"), and the like. In some embodiments, the request 205 also identifies one or more data subjects. As discussed, a data subject is the person that the requested data is about. In some embodiments, identifying the data subject(s) can also be of any level of specificity, including identifying specific people or indicating a group of people (e.g., "my relatives," "men under sixty," and the like).

In some embodiments, the request 205 further identifies the requesting entity, the purpose for the data, and the like. In some embodiments, indicating the purpose for the data can include explicitly stating a reason, selecting a predefined purpose, and the like. In certain embodiments, the request 205 includes natural language text. In one such embodiment, the system can identify the requested data, relevant data subjects, and/or the purpose of the request using NLP. For example, the analysis server may use NLP to extract concepts from the text, and determine the relevant industry or field (e.g., healthcare), desired data elements, relevant data subjects, and the like based on the identified concepts in the request 205.

At block 210, the analysis server determines whether the request 205 satisfies one or more defined access rules. In some embodiments, where machine learning models are not used, the determination includes comparing the identified (or specified) concepts in the request 205 to one or more defined lookup tables specifying acceptable or legitimate purposes for data. In certain embodiments, these lookup tables are industry-specific, such that a given purpose may be acceptable for some industries but unacceptable for others.

In some embodiments, the analysis server instead utilizes trained machine learning models to determine, at block 210, whether the request 205 satisfies the access rules. In some embodiments, as discussed above, one or more machine learning models are trained based on manually-curated access records comprising labeled training data. Further, as discussed, labeled training data can be used to train one or more machine learning models to perform analysis of whether the request 205 satisfies the access rules automatically. In some embodiments, the access rules relate to a defined code of ethics for data handling, as discussed.

In certain embodiments, a separate model is trained for each access rule. In such some embodiments, if the analysis server utilizes three access rules, block 210 will include passing the request 205 through three separate machine learning models. The input to the models (and thus, the input used to train the models) generally includes features of the request 205, such as the indicated purpose for the data or the field or industry the data relates to. For example, requests indicating that the data will be anonymized and used to drive medical research may be approved, while requests indicating that the data will be sold to advertising agencies may be denied. Generally, the request features that are evaluated can include any number and variety of concepts extracted from the request 205. As discussed above, in some embodiments, the features may include the identity of the requesting user and/or the data subject(s), the relationship between them, the indicated purpose for requesting the data (which may be explicitly stated, or may be determined based on processing the request using, e.g., NLP), the field or industry to which the request or data pertains, and the like.

As illustrated, if the request 205 fails to pass any access rule (e.g., indicated by a trained model rejecting the request 205), the workflow 200 continues to block 250, where the analysis server generates a custom report including one or more reasons for the rejection. In some embodiments, the analysis server can indicate which access rule(s) the request 205 failed. The analysis server can identify these failed rule(s) based on the model(s) that rejected the request. For any trained model that rejected the request, the analysis server can indicate that the corresponding access rule was not satisfied.

If the request 205 satisfies all access rules (e.g., if it is approved by all the machine learning models at this stage), the analysis server generates a data query 215, which is transmitted to one or more data repositories 215. In some embodiments, the analysis server generates the data query 215 based on the requested data indicated by the request 205. For example, if the request asked about the requestor's familial risk for developing DVT, the analysis server can generate a query to retrieve data records that correspond to data subjects that are related to the requestor, and which relate to DVT (e.g., diagnoses, test results, genetic markers, the name and/or location of the medical provider where the test(s) were done, the accuracy of the tests, procedures that were suggested or completed, and the like).

In the illustrated embodiment, the data repositories 125 store data created by one or more data generators 220. The data generators 220 generally include any source of data, such as medical or non-medical facilities, specific machines or equipment, the data subject themselves, others who facilitated collection of the data, and the like. For example, in the case of medical data, the data generators 220 may include the patient, the medical professional, the equipment used to retrieve or record data from the patient, the clinic or facility where the data was gathered, and the like.

As illustrated, the data repositories 125 return relevant data elements 225 based on the data query 215. As used herein, a data element 225 is generally a discrete piece of data, and can include any number and type of values. For example, a data element 225 may specify medical test results, indicate test(s) that were performed, specify the accuracy of the test(s), indicate the facility where the test(s) were executed, and the like.

At block 230, these data elements 225 are each evaluated individually to determine whether they satisfy the access rules. In some embodiments, the analysis server utilizes one or more trained machine learning model(s) to perform this review. In some embodiments, the analysis server utilizes models trained specifically for evaluating individual data elements. That is, while the model(s) used in block 210 were trained to evaluate request features, the model(s) used in block 230 can be trained to evaluate data elements. In some embodiments, the models used in block 230 are trained similarly to the models discussed above with reference to block 210. For example, the system may retrieve historical access records or data records which indicate, for each data element in the data records, whether a human user approved access (or whether the user determined that the data element passed a particular access rule).

Each such record may specify, as input features, one or more characteristics of the data. In embodiments, these features may include a type of the data, a specificity of the data, an origin of the data, a field to which the data relates, whether the data specifically identifies the data subject, and the like. In some embodiments, one or more of these features are specified in metadata associated with the data elements 225. In some embodiments, if the data element 225 includes natural language text (e.g., clinical notes), the analysis server can utilize natural language processing to extract concepts to be used as input features. Additionally, in some embodiments, each record is labeled with an indication as to whether the human user determined that the data element passed (or failed) one or more of the data access rules. In some embodiments, the models are then trained based on the records.

If a given data element fails any of the access rules, it is excluded from the report at block 250. In certain embodiments, the analysis server can also include one or more reasons for the rejection (e.g., indicating that one or more data elements were withheld because they failed a particular rule). In some embodiments, the analysis server can additionally generate and transmit a notification to the data subject indicating which data element(s) were withheld, and which were released.

In the illustrated workflow 200, any data elements 225 that were determined to satisfy the access rule(s) are combined to form a set of aggregated data elements ("aggregated data") 235. As illustrated, this aggregated data 235 is then evaluated, at block 240, to determine whether the aggregated data 235 satisfies the data access rule(s). For example, two or more data elements 225 may pass the access rules when evaluated individually at step 230 but fail when aggregated because, when combined, the elements allow identification of the underlying data subject.

In some embodiments, the evaluation at block 240 is similarly performed using one or more trained machine learning models. In some embodiments, the analysis server utilizes models trained specifically for this aggregated evaluation. That is, the analysis server may utilize a first set of one or more models to perform the request evaluation at block 210, a second set of one or more models to perform the data evaluation at block 230, and a third set of one or more models to perform the aggregated data evaluation at block 240. In some embodiments, the features evaluated at block 240 can mirror the features that were utilized in block 230.

As illustrated, if the aggregated data passes the access rules, the analysis server generates a custom report with the approved data elements (in block 245). In the illustrated embodiment, if the aggregated set fails one or more access rules, the analysis server generates a custom report while excluding at least of the data elements. In some embodiments, the analysis server can refrain from providing any data elements. In another embodiment, the analysis server can provide some subset of the approved data elements.

For example, upon determining that the aggregated data 235 fails one or more access rules, the analysis server may remove one or more data elements from the set and reevaluate the aggregated data set using the models. In some embodiments, the analysis server may iteratively evaluate different combinations of data elements in order to identify which data elements should be removed from the set. For example, the analysis server may attempt to find the combination of data elements that passes the rules with the fewest elements removed (such that the analysis server can return the most data possible).

Figure 3:
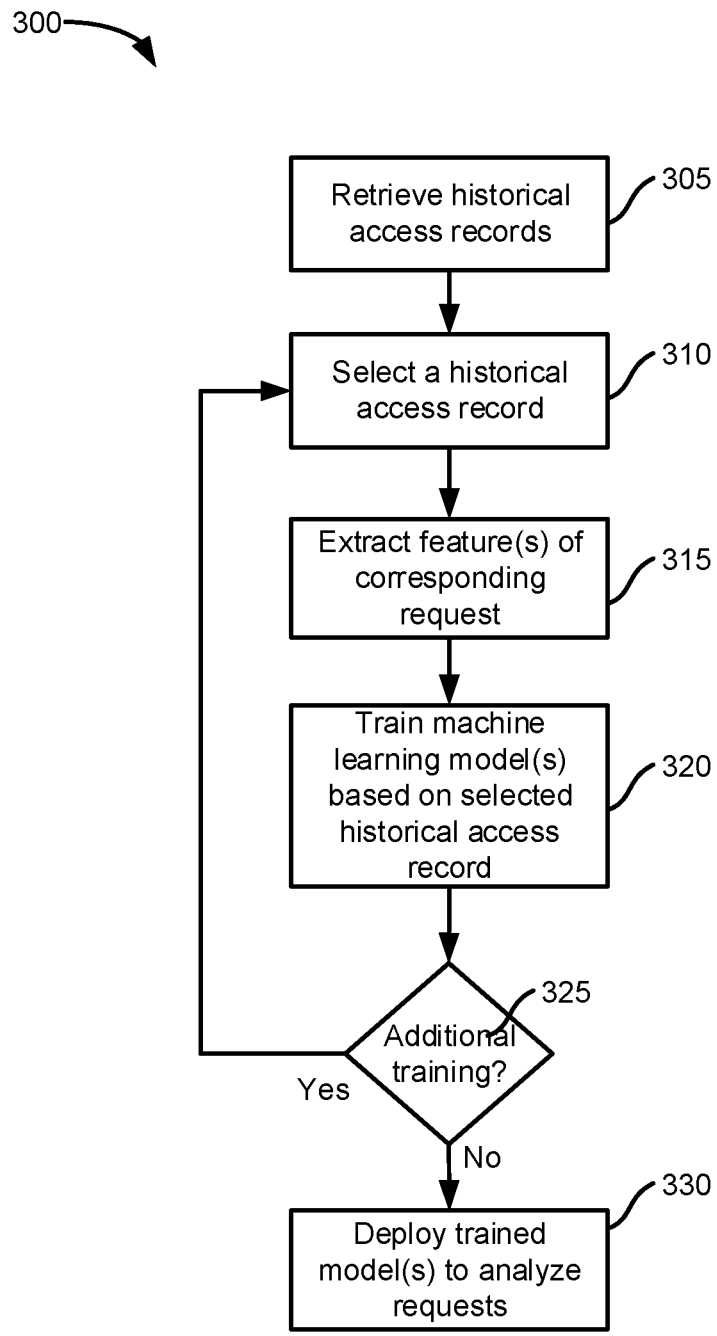
FIG. 3 is a flow diagram depicting a method for training machine learning models to control data access based on characteristics of the data request, according to some embodiments disclosed herein.
Figure 4:
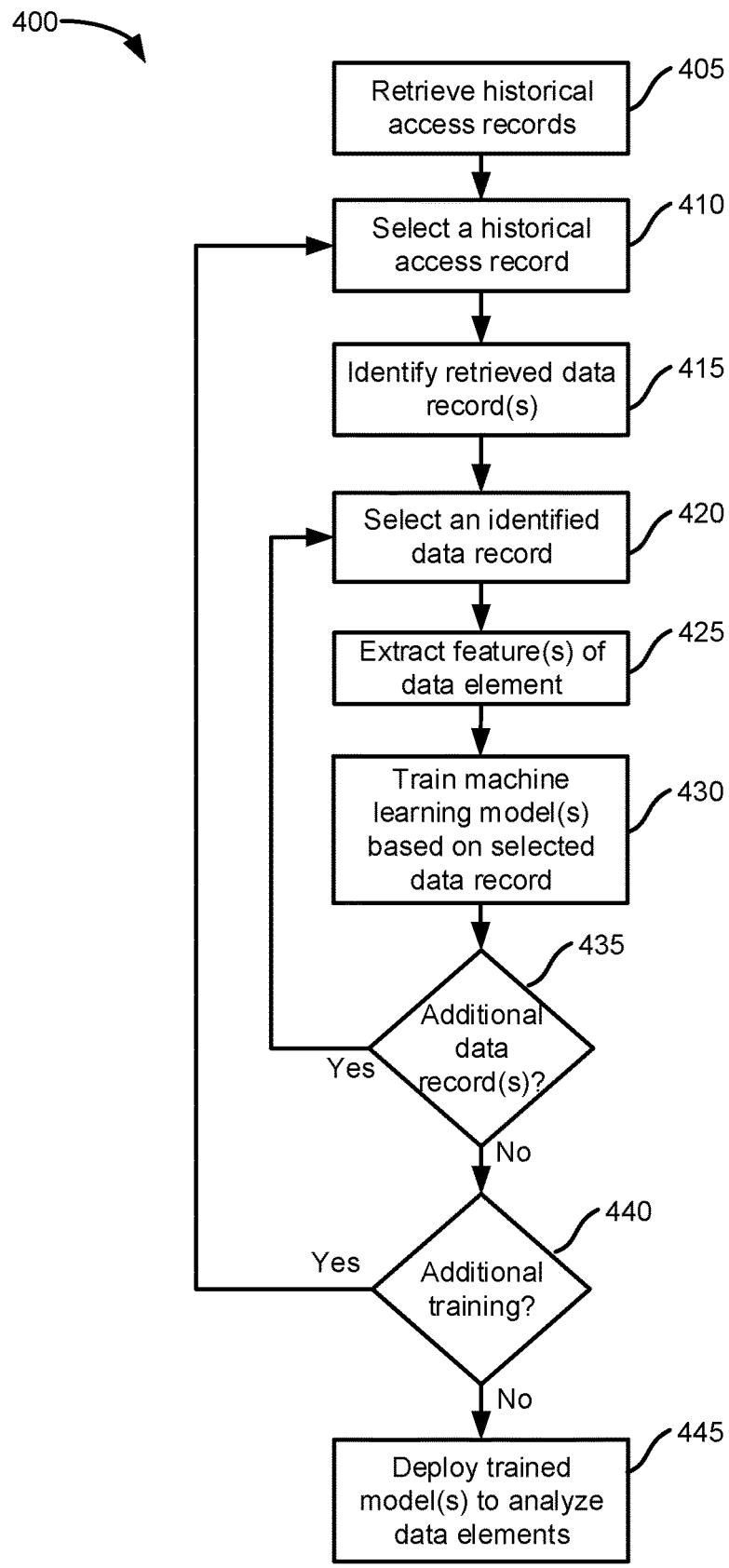
FIG. 4 is a flow diagram depicting a method for training machine learning models to control data access based on characteristics of individual data elements, according to some embodiments disclosed herein.
Figure 5:
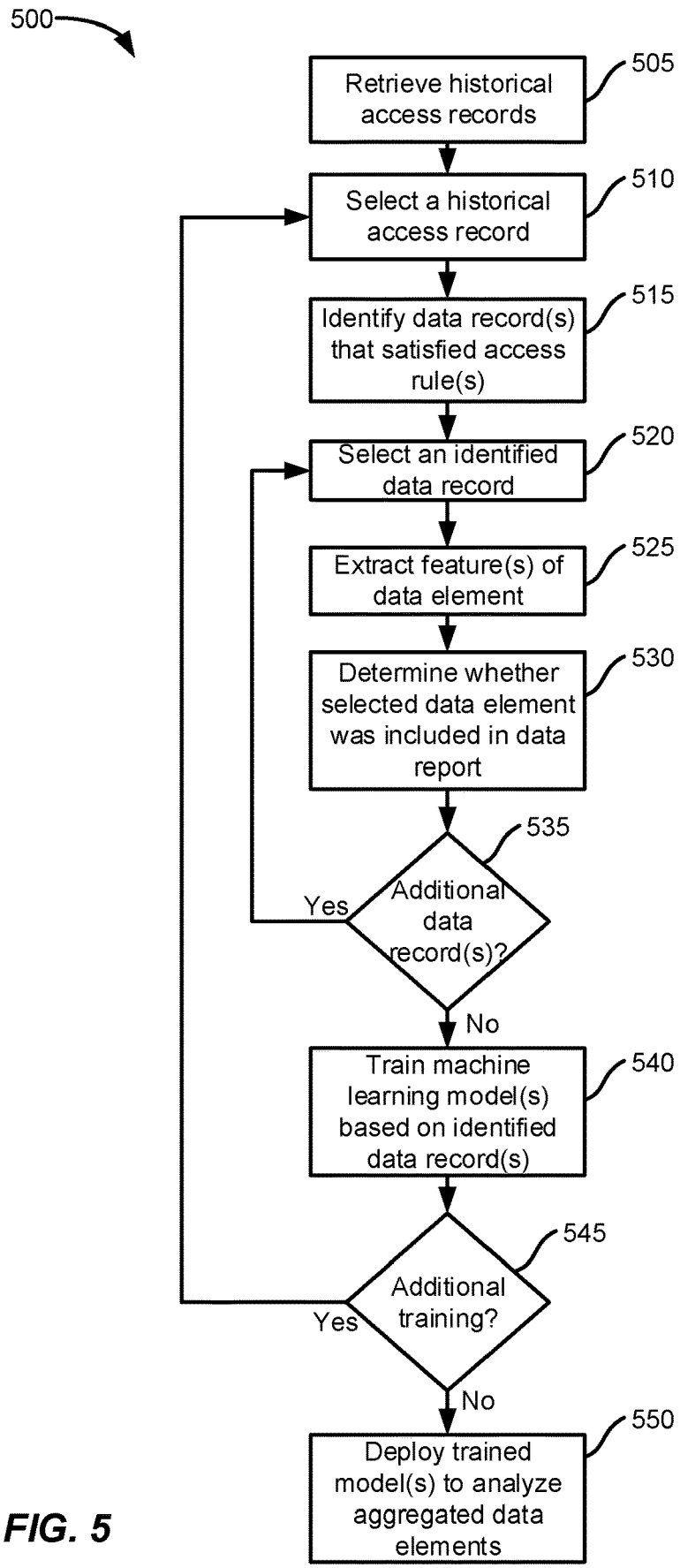
FIG. 5 is a flow diagram depicting a method for training machine learning models to control data access based on characteristics of aggregated data elements that individually satisfy access rules, according to some embodiments disclosed herein.

FIGS. 3-5 describe in further detail techniques for training the machine learning models discussed herein, such as for evaluating data requests, data elements, and aggregated data.

FIG. 3 is a flow diagram depicting a method 300 for training machine learning models to control data access based on characteristics of the data request, according to some embodiments disclosed herein. In some embodiments, the method 300 is used to train models to evaluate requests (e.g., at block 210 of FIG. 2). The method 300 begins at block 305, where a training server (e.g., training server 135) retrieves a set of historical access records. In some embodiments, each historical access record corresponds to a prior data request and includes a label indicating whether a human reviewer approved the request (and/or whether the request was determined to satisfy one or more data access rules). For example, during an initial manual/training phase, the training server may collect data as reviewers evaluate and approve or reject requests for data. Based on this monitoring, the training server can build a training data set of historical access records.

At block 310, the training server selects one of the historical access records. In embodiments, this selection can utilize any suitable criteria (e.g., beginning with the oldest records, beginning with the most recent records, and the like) as the training server will iterate through each historical access record in the training set. The method 300 then continues to block 315, where the training server extracts one or more features of the request that corresponds to the selected record. These features will be used as the input features to the machine learning model(s). This may include extracting concepts from the request such as the purpose for the request, the field or industry it relates to, and the like. For example, the training server may determine whether the request relates to health or wellbeing, economic gain, and the like. In certain embodiments, the training server utilizes NLP to extract these features from the request. In some embodiments, the requests may have been previously evaluated to extract the features, and these features may be stored in the access records. In some embodiments, each access record is further associated with a label indicating whether the request was approved or rejected.

The method 300 then continues to block 320, where the training server trains one or more machine learning models based on the selected record. In some embodiments, the training server does so by providing the features (extracted in block 315) as input to a model. This model may be a new model initialized with random weights and parameters, or may be partially or fully pre-trained (e.g., based on prior training rounds). Based on the input features, the model-in-training generates some output (e.g., a classification as "pass" or "fail" for one or more access rules. In embodiments, the training server can compare this generated classification with the actual label for the record (as indicated in the record) to compute a loss based on the difference between the actual result and the generated result. This loss is then used to refine one or more internal weights and parameters of the model (e.g., via backpropagation) such that the model learns to classify requests more accurately.

In some embodiments, the training server trains a model to analyze requests in view of the collective set of access rules. That is, the training server can train the model to evaluate the requests in view of all access rules simultaneously, and output a binary "pass" or "fail" based on whether the request passed all access rules or failed at least one (or output a set of determinations, one for each rule). In other embodiments, as discussed above, the training server trains a separate model for each access rule.

The method 300 then continues to block 325, where the training server determines whether additional training is needed. This may include evaluation of any terminating criteria, such as whether any additional historical access records remain in the training data set. In various embodiments, other termination criteria may include, without limitation, whether a predefined amount of time or computing resources have been expended training the model, whether the model has reached a predefined minimum accuracy, and the like. If additional training remains to be completed, the method 300 returns to block 310.

If not, the method 300 continues to block 330, where the training server deploys the trained model(s) to analyze incoming data requests during runtime. In some embodiments, this includes transmitting some indication of the trained model(s) (e.g., a weights vector) that can be used to instantiate the model(s) on another device. For example, the training server may transmit the weights of the trained model(s) to an analysis server. The models can then be used to evaluate newly-received data requests.

FIG. 4 is a flow diagram depicting a method 400 for training machine learning models to control data access based on characteristics of individual data elements, according to some embodiments disclosed herein. In some embodiments, the method 400 can be used to train models to evaluate individual data elements (e.g., at block 230 of FIG. 2). The method 400 begins at block 405, where a training server retrieves one or more historical access records, each corresponding to a prior data request. In some embodiments, the training server selects access records where the request was approved. That is, because no data is retrieved or analyzed for rejected requests, the training server can retrieve only approved requests where at least one data element was retrieved and evaluated by the human reviewer. In some embodiments, the historical access records are each associated with one or more data records, where each data record corresponds to a respective data element that was retrieved based on the request.

The method 400 then continues to block 410, where the training server selects a historical access record from the set of training access records. In embodiments, this selection can utilize any suitable criteria (e.g., beginning with the oldest records, beginning with the most recent records, and the like) as the training server will iterate through each historical access record in the training set. At block 415, the training server identifies the data record(s) associated with the selected access record. In some embodiments, each data record corresponds to a data element that was retrieved in response to the request corresponding to the selected access record. For example, suppose the request corresponding to the selected access record resulted in ten data elements being retrieved from the data repositories. In some embodiments, the access record will therefore include or be linked or otherwise associated with ten data records (one for each data element). In some embodiments, each data record includes the features of the corresponding data element, as well as a label indicating whether the data element satisfied one or more access rules.

At block 420, the training server selects one of the identified data records. The method 400 then continues to block 425, where the training server extracts one or more features of the data element that corresponds to the selected record. The features generally correspond to characteristics of the data element, such as the type of data, the source of the data, a predefined sensitivity or privacy level of the data, and the like. In some embodiments, the features include a data profile for the data element, where the data profile is a metadata structure that specifies the relevant features. In certain embodiments, the training server also extracts one or more data source profiles for the data element. A data source profile is generally a metadata structure specifying features of the source of the data element. For example, if the data element was collected by a particular medical facility, the data source profile may specify features of the facility (such as its name, location, and the like). Similarly, if the data element was collected using a particular piece of equipment, the profile may specify the identity and type of equipment, maintenance records, accuracy of the equipment, and the like. In some embodiments, each data record may be associated with any number of profiles corresponding to entities involved in collecting and forwarding the data to the data repository.

The method 400 then continues to block 430, where the training server trains one or more machine learning models based on the selected data record. In some embodiments, the training server does so by providing the features (extracted in block 425) as input to a model. This model may be a new model initialized with random weights and parameters, or may be partially or fully pre-trained (e.g., based on prior training rounds). Based on the input features, the model-in-training generates some output (e.g., a classification as "pass" or "fail" for one or more access rules. In embodiments, the training server can compare this generated classification with the actual label (included with the data record) to compute a loss based on the difference between the actual result and the generated result. This loss is then used to refine one or more internal weights and parameters of the model (e.g., via backpropagation) such that the model learns to classify individual data elements more accurately.

In some embodiments, the training server trains a model to analyze data elements in view of the collective set of access rules. That is, the training server can train the model to evaluate the data elements in view of all access rules simultaneously, and output a binary "pass" or "fail" based on whether the data element passed all access rules or failed at least one (or output a set of determinations, one for each rule). In other embodiments, as discussed above, the training server trains a separate model for each access rule.

The method 400 then continues to block 435, where the training server determines whether the selected access record includes at least one more additional data record that has not yet been evaluated. If so, the method 400 returns to block 420. If not, the method 400 continues to block 440, where the training server determines whether additional training is needed. This may include evaluation of any terminating criteria, such as whether any additional historical access records remain in the training data set. In various embodiments, other termination criteria may include, without limitation, whether a predefined amount of time or computing resources have been expended training the model, whether the model has reached a predefined minimum accuracy, and the like. If additional training remains to be completed, the method 400 returns to block 410.

If not, the method 400 continues to block 445, where the training server deploys the trained model(s) to analyze individual data elements retrieved during runtime. In some embodiments, this includes transmitting some indication of the trained model(s) (e.g., a weights vector) that can be used to instantiate the model(s) on another device. For example, the training server may transmit the weights of the trained model(s) to an analysis server. The models can then be used to evaluate data elements that are retrieved in response to newly-received data requests.

FIG. 5 is a flow diagram depicting a method 500 for training machine learning models to control data access based on characteristics of aggregated data elements that individually satisfy access rules, according to some embodiments disclosed herein. In some embodiments, the method 500 can be used to train models to evaluate aggregated data elements corresponding to aggregated data (e.g., at block 240 of FIG. 2). The method 500 begins at block 505, where a training server retrieves one or more historical access records, each corresponding to a prior data request. In some embodiments, the training server selects access records where the request was approved. That is, because no data is retrieved or analyzed for rejected requests, the training server can retrieve only approved requests where at least one data element was retrieved and evaluated by the human reviewer. In some embodiments, the training server only retrieves records where at least two data elements were retrieved (e.g., such that the aggregated data might cause a different result than the individual evaluations). In some embodiments, the historical access records are each associated with one or more data records, where each data record corresponds to a respective data element that was retrieved based on the request.

The method 500 then continues to block 510, where the training server selects a historical access record from the set of training records. In some embodiments, this selection can utilize any suitable criteria (e.g., beginning with the oldest records, beginning with the most recent records, and the like) as the training server will iterate through each historical access record in the training set. At block 515, the training server identifies the data record(s) associated with the selected access record that were determined to satisfy the access rules. That is, the training server can identify which data elements, if any, were deemed to individually satisfy the access rules. For example, suppose the system retrieved ten data elements based on the request, and three of the data elements, when individually evaluated, failed one or more data access rules. In some embodiments, the training server can identify the subset of data elements (e.g., the remaining seven) that passed the individual review.

At block 520, the training server selects one of the identified data records that passed the individual review. The method 500 then continues to block 525, where the training server extracts one or more features of the data element that corresponds to the selected record. As discussed above, the features generally correspond to characteristics of the data element, such as the type of data, the source of the data, a predefined sensitivity or privacy level of the data, and the like. In some embodiments, the features include a data profile for the data element, where the data profile is a metadata structure that specifies the relevant features. In certain embodiments, the training server also extracts one or more data source profiles for the element. A data source profile is generally a metadata structure specifying features of the source of the data. For example, if the data was collected by a particular medical facility, the data source profile may specify features of the facility (such as its name, location, and the like). Similarly, if the data was collected using a particular piece of equipment, the profile may specify the identity and type of equipment, maintenance records, accuracy of the equipment, and the like. In some embodiments, each data record may be associated with any number of profiles corresponding to entities involved in collecting and forwarding the data to the data repository.

At block 530, the training server determines whether the data element was included in the generated data report. If the data was excluded, a human must have determined that its inclusion would cause the aggregate set to violate one or more of the data access rules. In contrast, if it was included, the reviewer determined that the selected element, when combined with the other included elements, still satisfied the access rules.

The method 500 then continues to block 535, where the training server determines whether the selected access record includes at least one more additional data record that has not yet been evaluated. If so, the method 500 returns to block 520. If not, the method 500 continues to block 540, where the training server trains one or more machine learning models based on the identified data records that individually satisfied the access rules. In some embodiments, the training server does so by providing the features for each data record (extracted in block 525) as input to a model. This model may be a new model initialized with random weights and parameters, or may be partially or fully pre-trained (e.g., based on prior training rounds). Based on the input features, the model-in-training generates some output (e.g., a classification of the aggregated set as "pass" or "fail") for one or more access rules. In embodiments, the training server can compare this generated classification with the actual results determined in block 530 (e.g., the actual set of data elements that were included in the report) to compute a loss based on the difference between the actual result and the generated result. This loss is then used to refine one or more internal weights and parameters of the model (e.g., via backpropagation) such that the model learns to classify aggregated sets of data elements more accurately.

In some embodiments, the training server trains a model to analyze aggregated data in view of the collective set of access rules. That is, the training server can train the model to evaluate the aggregated data in view of all access rules simultaneously, and output a binary "pass" or "fail" based on whether the aggregated set passed all access rules or failed at least one (or output a set of determinations, one for each rule). In other embodiments, as discussed above, the training server trains a separate model for each access rule.

The method 500 then continues to block 545, where the training server determines whether additional training is needed. This may include evaluation of any terminating criteria, such as whether any additional historical access records remain in the training data set. In various embodiments, other termination criteria may include, without limitation, whether a predefined amount of time or computing resources have been expended training the model, whether the model has reached a predefined minimum accuracy, and the like. If additional training remains to be completed, the method 500 returns to block 510.

If not, the method 500 continues to block 550, where the training server deploys the trained model(s) to analyze aggregate sets of data elements retrieved during runtime. In some embodiments, this includes transmitting some indication of the trained model(s) (e.g., a weights vector) that can be used to instantiate the model(s) on another device. For example, the training server may transmit the weights of the trained model(s) to an analysis server. The models can then be used to evaluate aggregated sets of data elements that are determined to individually satisfy the rules.

Figure 6:
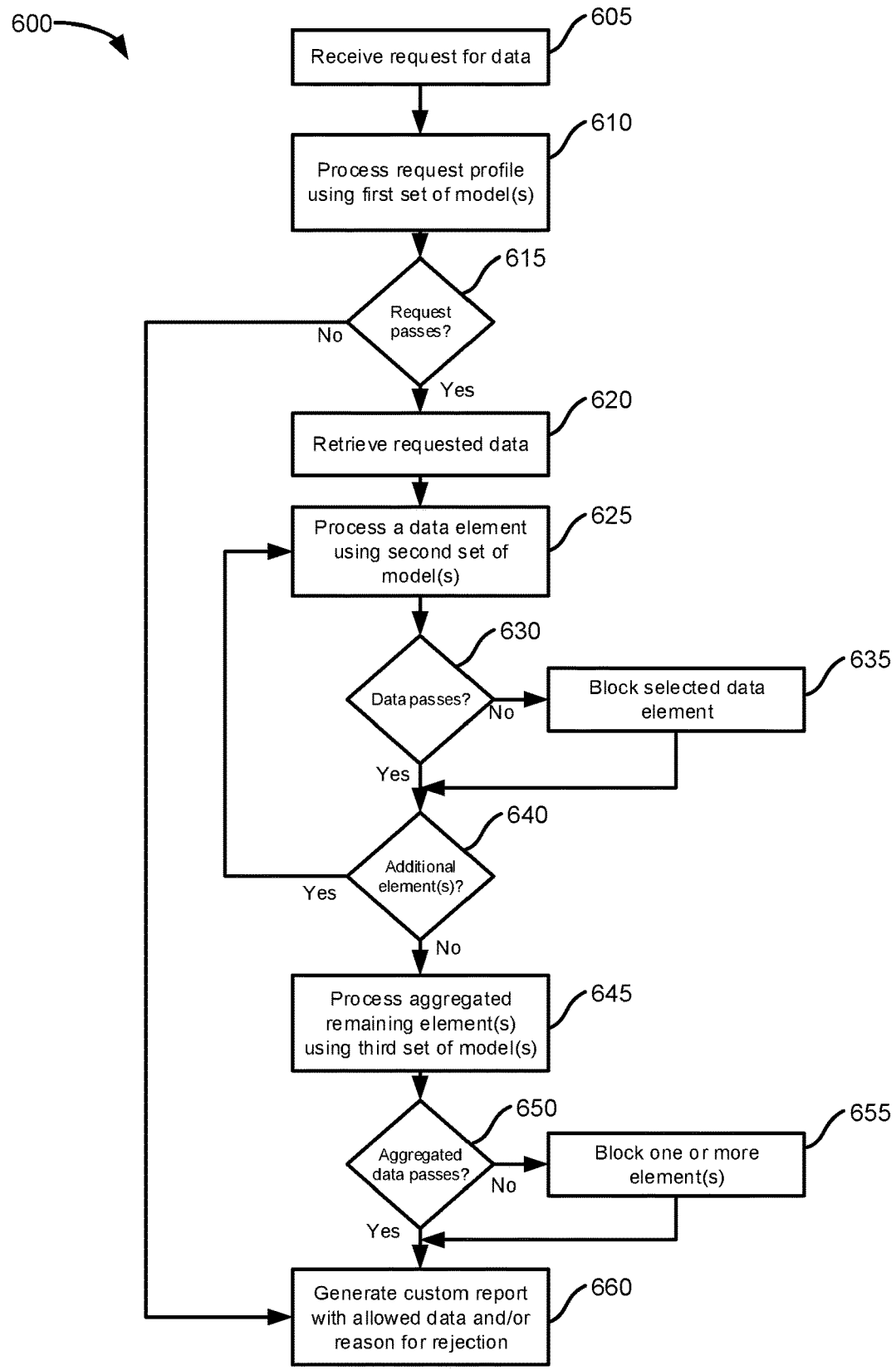
FIG. 6 is a flow diagram depicting a method for using trained machine learning models to control data access, according to some embodiments disclosed herein.

FIG. 6 is a flow diagram depicting a method 600 for using trained machine learning models to control data access, according to some embodiments disclosed herein. In an embodiment, the method 600 leverages machine learning and/or rules engines to provide a common methodology across industries in order to act as a trusted source to retrieve relevant data based on valid requests.

The method 600 begins at block 605, where an analysis server (e.g., analysis server 110) receives a request for data access. As discussed above, this request generally indicates the data that is desired, either by explicit reference, by providing characteristics that can be used to filter or identify the data, and the like. Additionally, in embodiments, the request generally indicates the purpose or reason for the request. In some embodiments, the request includes a natural language text description of the requested data and/or the proposed usage. For example, the request may include a question such as "am I at increased risk of DVT due to my family history? If so, what markers should we screen for?" In some embodiments, the request can additional include other fields such as a timeline when the data is needed (or desired) by, and any additional support documentation that can be provided. In some embodiments, these request features are included in a metadata structure referred to as a request profile (either provided directly, or generated based on evaluating the request using NLP).

The method 600 then continues to block 610, where the analysis server processes the request profile using a first set of one or more trained machine learning models. In some embodiments, as discussed above, these models are generally trained to determine whether requests satisfy one or more access rules. For example, to determine whether the request improves humanity without harming the data subject, the analysis server may determine whether the request relates to health or wellbeing (indicating it benefits humanity), whether the use would involve commercial gain (indicating it does not), and the like. Additionally, the models may be used to determine whether the proposed use is legitimate (e.g., whether it is clinical or medical, or whether the user is simply curious or intends to use the data for bad). Similarly, the models may be used to determine whether the data is protected (e.g., whether it will remain confidential). In some embodiments, as discussed above, a separate trained model is used to evaluate the request in view of each individual access rule.

At block 615, the analysis server determines whether the request passes the access rules based on the classification(s) provided by the models. For example, if the request is for commercial gain, the analysis server may reject the request.

If the request does not pass, the method 600 continues to block 660, where the analysis server generates a custom report rejecting the request. In some embodiments, the report includes the reason(s) why the request is rejected (e.g., specifying the rule(s) that were violated). If the request satisfies the access rules, the method 600 continues to block 620.

At block 620, the analysis server retrieves the requested data from one or more data repositories. The method 600 then continues to block 625, where the analysis server processes one of the retrieved data elements using a second set of one or more trained models. That is, the analysis server processes each data element individually. In some embodiments, the analysis server uses a single model to evaluate each data element. In another, the analysis server uses a set of models (e.g., one for each data access rule).

In some embodiments, processing the data element includes extracting features or characteristics of the data element (e.g., one or more data profiles for the data and/or for sources or generators of the data). These features are then used as input for the one or more models. At block 630, the analysis server determines whether the selected data element satisfies all of the access rules. If not, the method 600 continues to block 635, where the analysis server blocks the selected data element (e.g., flags it for exclusion from the custom report, discards it, or otherwise stops processing or considering it). If the analysis server determines that the data element passed the rules, the analysis server adds it to a subset of approved data elements and the method 600 continues to block 640.

Continuing the above example for a DVT-related request, the analysis server may determine that use of some data elements can improve humanity without harming or identifying the data subject, such as the DVT markers that were tested for and/or identified, the family history of the requestor, the diagnoses of relatives, the types of tests performed, and the like. In contrast, some example data elements that might fail this rule because they do not improve humanity or might harm the data subject include doctor's notes, specific identities of family members who have or had DVT, and the like.

Similarly, as examples of elements where usage can be considered legitimate, the analysis server may determine that data such as the DVT markers, the diagnoses, the types of tests used, and the like have legitimate use. In contrast, the analysis server may determine that data elements like any non-DVT related history, tests unrelated to DVT, and the like have no legitimate usage in view of the request. Such elements may be restricted. Additionally, as examples of elements where the analysis server may determine that the data is not protected, the analysis server may determine that DVT markers and diagnoses are satisfactory, while data elements such as specific patient names, dates of birth, and non-DVT diagnoses should be excluded.

Returning to FIG. 6, at block 640, the analysis server determines whether there are any additional data elements that were retrieved but have not yet been evaluated. If so, the method 600 returns to block 625. Otherwise, the method 600 continues to block 645.

At block 645, the analysis server processes the aggregated set of remaining data elements (e.g., the data elements that were found to individually satisfy the rules) using a third set of one or more machine learning models. As discussed above, this may include providing the aggregated set of features (from each data element in the set of approved elements) using the third set of model(s). At block 650, the analysis server determines whether the aggregated data passes the data access rules. If so, the method 600 continues to block 660, where the analysis server generates a report including the aggregated data. In some embodiments, if any elements were excluded (e.g., at block 635), the analysis server can include an explanation (e.g., identifying the rule(s) that were failed for each excluded data element).

If, at block 650, the analysis server determines that the aggregated data fails to pass the set of rules, the method 600 continues to block 655, where the analysis server excludes at least one of the data elements from the final report. For example, data elements identifying a medical professional or facility location involved may individually pass the access rules, but when combined with other approved data elements, they may cause the data subject to be identifiable or may violate some other access rule. In some embodiments, the analysis server can iteratively remove one or more data elements from the aggregated data and re-process the remaining set until a satisfactory aggregated set of data elements is found. The method 600 then continues to block 660.

In some embodiments, a notification can also be sent to the data subject(s), informing them as to what data was shared. In certain embodiments, the notification also indicates the requestor, the reason for the request, and the like.

As another example of the evaluation of block 615, suppose an adopted individual requests to know the current location(s) of their natural parent(s) in order to receive information about their medical history. In one embodiment, such a request may be denied at block 615 because the indicated purpose (receiving and reviewing medical history) can be satisfied with a less intrusive request (e.g., a request specifically for the data, rather than the location of the parents).

As another example, suppose an adopted individual requests general information about their natural parents in order to review their medical history. In an embodiment, this request may pass block 615 (e.g., because the requestor is valid and the requested data and stated purpose are aligned), and data may be retrieved at block 620 from one or more sources (such as the relevant adoption agency). At block 630, some data (such as the name(s) of the parents, date of adoption, family history, basic medical history, and the like) may pass the access rules. In contrast, data such as the current contact information of the parents, social security numbers of the parents, and the like will fail because they violate the access rules.

As an example of data elements that, when aggregated, may fail the evaluation at block 650, consider the adopted child example. Although data such as the names of each parent and date or location of the adoption may individually pass the rules (at block 630), such data may fail to pass the evaluation at block 650 (e.g., because it enables identification of the parents). In contrast, data such as the basic medical history may still pass this aggregated evaluation.

As yet another example, suppose an individual already knows the identity of their biological parents and requests that their parent's health insurance company release medical genetic testing information in order to determine their genetic risk factors. In one embodiment, such a request may pass the evaluation at block 615 because it is a valid request for a valid purpose that satisfies the rules of access. At block 630, data such as the physical attributes of the parents (e.g., height, weight, BMI, and the like) insurance information, personal responses to surveys or questionnaires (such as drug use), identifications of the company(s) that performed the tests, and the like may be denied. In contrast, data such as the date the testing was performed, the location(s) of the testing facilities, the specific genetic biomarker values that were found, and the like will satisfy the rules at block 630. However, at block 650, data such as the locations of the facilities, dates of testing, doctor's notes, and the like will fail the aggregate analysis while data such as the identified biomarkers will pass.

As yet another example of the evaluation at block 615, suppose a local government official requests report cards or grade information for all students in the county in order to improve educational results and prevent students from dropping out of school. In an embodiment, such a request will fail the evaluation at block 615 because the intent (to improve outcomes and reduce dropping out) can be satisfied with a less intrusive request that does not share such data.

Suppose instead that a government official wishes to improve education results, and requests information on parents who have requested additional help out of concern for their children's education. The request may indicate that the official wishes to increase or change strategies with respect to tutoring and/or classes for these interested individuals, in order to improve their educational outcomes. In an embodiment, such a request may pass the evaluation at block 615 because it is valid and limited to least intrusive data needed to satisfy the intent.

In an embodiment, at block 630, data such as parent-teacher notes, the names of the parents, the subjects of concern, the age of the students, the names of their teachers, the tutors and learning techniques being used, and the like may satisfy the rules. Such data is relevant and does not harm the subject or otherwise violate the rules. In contrast, data such as the specific report cards of the students, financial status of the parents, specific identifiers of the students, and the like may fail this evaluation at block 630 because it may harm the data subject or is otherwise not needed to satisfy the intent.

Continuing the above example with respect to government officials requesting information on parents or students that requested additional help, some data such as the names of the students (e.g., included on notes between the parents and teacher), the specific grades received on a given test, the names of the parents or teachers, and the like may fail the evaluation at block 650. Such data, in the aggregate may harm the subjects. In contrast, data such as the subjects of concern, known learning disabilities, age group or range, and the like may pass this evaluation and be included in the report.

As still another example of application of the method 600, suppose a government official requests information about the taxpaying individuals in each home in their county in order to provide taxpayer-specific rebates. In an embodiment, this request may pass the evaluation at block 615 because the requestor identity and request/intent are valid. At block 630, data such as the social security number(s) of the taxpayers, gross income, number of dependents, zip code, and the like may each pass the individual analysis at block 630 because they can satisfy the request without harm. In contrast, data such as the citizenship status of the individuals, identifies, disability status, and the like may fail. In the aggregate, at block 650, data such as social security numbers, number of dependents, gross income, and the like may fail because it can harm the subject. In contrast, data such as the number of taxpayers in the area may pass.

As an additional example, suppose a government official requests information about the number of people eligible for publicly-provided insurance coverage in order to access to insurance for all residents. Such a request may pass evaluation at block 615. At block 630, data such as the family income of each subject, zip codes where they live, pre-existing health conditions, and the like may fail the access rules. In contrast, data such as their taxpayer information, age, social security numbers, residency, employment status, and the like may pass this individual evaluation because it can service the request without harm. At block 650, however, data like the social security numbers, age, marital status, and the like will fail the aggregated review while data such as their eligibility for coverage, names, and the like may pass.

As yet another example, suppose an airline requests the identity of all individuals who have come in contact with contagious individuals over a specified period of time, in order to minimize the risk of illness spreading and notify the relevant passengers of concerns. Such a request may fail the evaluation at block 615 because it can be addressed with less intrusive requests.

Continuing the above example, suppose instead the airline requested a determination as to whether any passengers have come in contact with contagious individuals (without specifically identifying the passengers). In an embodiment, this request may pass the evaluation at block 615. At block 620, the relevant data such as the passenger identities, location(s) (e.g., using social media or GPS), calendars, relevant testing agencies and lab results, and the like may be retrieved. At block 630, data such as the individual names or identifiers of the passengers, ages, pre-existing conditions, and the like may be excluded. However, data such as the contact tracing info (e.g., location data), current health results, and the like can be included. At block 650, in the aggregate, data such as the names of those who have contacted the passengers, ages of the passengers, current locations of potentially-contagious individuals, and the like may be excluded. In contrast, data such as a binary "yes" or "no" indication as to whether anybody was in contact with a contagious person, whether the contact was within a predefined time, and the like may pass the rules.

As another example, suppose a patient (or potential patient) requests information from one or more facilities about patients who had retinal detachment surgery in order to pick a treatment plan and medical provider for their own surgery. Such a request will fail the evaluation at block 615, because the intent can be satisfied with less intrusive requests or data.

Suppose instead the patient requested information about the success rate of such surgeries, or any permanent damage or harm caused by them. This request may pass the evaluation at block 615. At block 630, data such as the specific practice locations, specific patient information, and the like will fail the review. In contrast, data such as a list of practices and/or surgeons that perform the surgery, indications of factors that affect success rates, lists of the medical devices used in the surgery, ocular measurements or other data of the patients, and the like may pass this evaluation.

At block 650, however, data such as the specific practices or individual surgeons with poor success rates, the specific devices used in the surgery, and the like may be excluded. In contrast, data such as a list of surgeons with high success rates, indications of complications or harm, and the like may be included.

As another example, suppose a government official or a contracted non-profit requests data relating to clinical trials for a vaccine that is currently in development in order to evaluate the results. The request may pass evaluation at block 615, and data can be retrieved. At block 630, data such as the ingredients of the vaccine, side effects, dates or times the vaccine was administered, dosage, reports of concerns, independent evaluations of the vaccine, the stage of development, the phase of the trial, the number of participants, reported adverse events, indications of patients that dropped from the trial, and the like may all pass the access rules. In contrast, data such as the specific patient names, locations, addresses, and the like may fail this review.

Continuing this example, at block 650, the names and locations of the specific trials, the pricing structure of the vaccines, the costs, and the like may all be excluded in the aggregate. In contrast, data such as the vaccine efficacy, antibody or immune response by age group, reported side effects, and the like may pass this aggregate review for inclusion in the report.

As another example, suppose a researcher requests access to raw image data for patients that received a surgical treatment in order to analyze the morphological changes over time around the operating site. Such a request may pass the evaluation at block 615. At block 630, data such as the hospitals or sites that perform the surgery, devices used in the surgery, imaging devices used to gather the data, doctor notes, patient complaints, side effects, and the like may pass individual evaluation. In contrast, data such as the location(s) of the facilities, names of the patients, history of the patients, and the like will fail this review.

At block 650, data like the raw images, summary of pre-existing conditions that are relevant to the images or operation, and the like may pass the aggregated review. In contrast, data such as doctor notes that are not relevant to the image analysis, names or identifies of the doctors, specific medical equipment used to capture the images, side effects that are not related to the images, and the like may be excluded.

As still another example of application of the method 600, suppose a school teacher requests information from health services for all records of any health treatments a given student has received because they suspect the student is being abused. In an embodiment, this request will fail evaluation at block 615 because, although the requestor is legitimate, the records requested are more than what is needed. For example, the request could satisfy the rules if it was targeted towards frequency of absences or tardiness, the number of medical visits, and the like (without specific health data being requested).

As another example, suppose a professor requests location data for a student because they suspect the student has lied about a family emergency in order to avoid class. In an embodiment, such a request will fail the evaluation at block 615 because it is harmful to the data subject (and can also likely be satisfied if different data was requested).

As yet another example, suppose an adult child of a deceased individual requests access to social networking accounts of the deceased individual in order to download photos and videos for a video tribute. Such a request may pass evaluation at block 615. At block 630, information like publicly available pictures and videos from the social media account, a list of friends, and the like may pass individual review. In contrast, data such as non-public information, saved posts or content, private conversations of the deceased, and the like can be excluded.

As still another example, suppose a person requests access to the social networking account of a deceased relative in order to determine whether the relative was engaging in illicit activity. At block 615, such a request may be denied because the intent does not satisfy the access rules (e.g., it does not improve humanity, or may harm the data subjects).

As another example, suppose an individual wishes to obtain diagnosis information for a family member in order to get a second opinion. Such a request may pass evaluation at block 615. At block 630, data such as lab results related to the diagnosis, genetic predispositions, symptoms, and the like may pass evaluation, while data such as information unrelated to the diagnosis (like blood type) are excluded. At block 650, information such as the patient name, doctor name, hospital identity or location, and the like can be excluded while data such as the relevant lab results pass the access rules.

Figure 7:
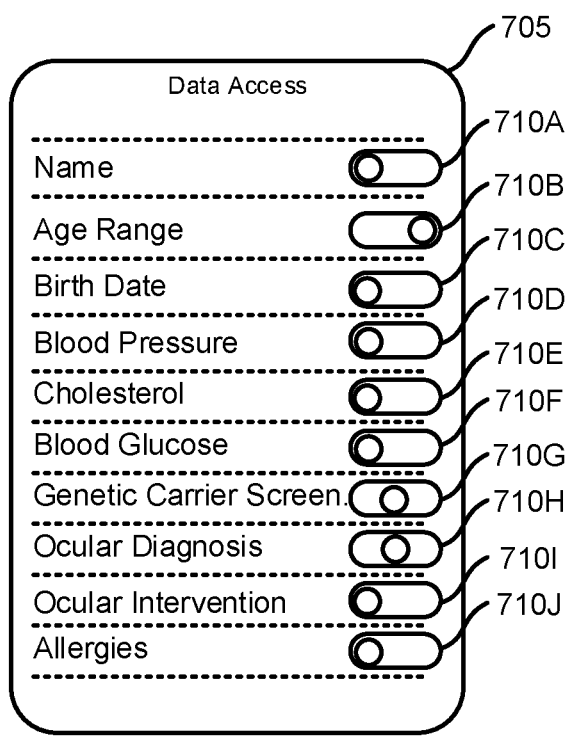
FIG. 7 depicts a graphical user interface (GUI) to enhance data access control and notification, according to some embodiments disclosed herein.

FIG. 7 depicts a graphical user interface (GUI) 705 to enhance data access control and notification, according to some embodiments disclosed herein. In the illustrated embodiment, the GUI 705 includes a series of data elements 710A-J, along with an indication, for each data element 710, of whether the data element is shared (or is shareable). In the illustrated embodiment, the GUI 705 uses sliding indicators, where one position corresponds to blocked data elements/data that is not shared (e.g., the far left of the slider), one corresponds to data that is sometimes or restrictively shared such as on a case-by-case basis, depending on the particular request (e.g., the center of the slider), and one position corresponds to data that is always or freely shared (e.g., the far right side of the slider). In some embodiments, the data elements 710 are each associated with other visual aids, such as color coding (e.g., red, yellow, and green).

In some embodiments, users can use the GUI 705 to provide preferences or selections to the analysis server. For example, the user may specify that although one element was shared (or is selectively shared), they would rather it always be locked. Alternatively, the user may indicate that although one data element was blocked, they would like it to be shareable (at least selectively). In some embodiments, this user feedback can be used to iteratively refine the models used to make access decisions.

Figure 8:
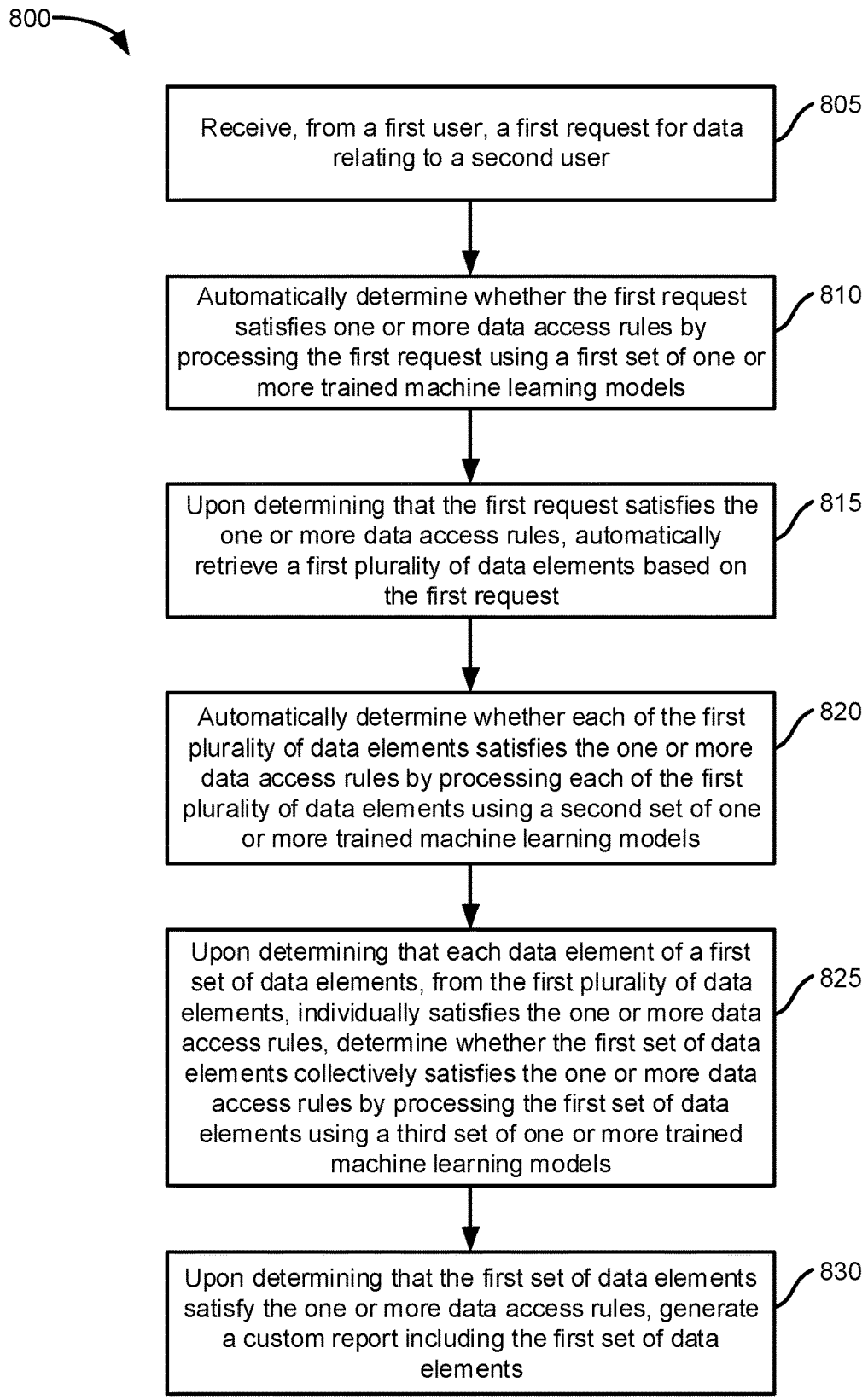
FIG. 8 is a flow diagram depicting a method for using one or more machine learning models to automatically control data access, according to some embodiments disclosed herein.

FIG. 8 is a flow diagram depicting a method 800 for using one or more machine learning models to automatically control data access, according to some embodiments disclosed herein. The method 800 begins at block 805, where an analysis server receives, from a first user, a first request for data relating to a second user. At block 810, the analysis server automatically determines whether the first request satisfies one or more data access rules by processing the first request using a first set of one or more trained machine learning models. The method 800 then continues to block 815 where, upon determining that the first request satisfies the one or more data access rules, the analysis server automatically retrieves a first plurality of data elements based on the first request. At block 820, the analysis server automatically determines whether each of the first plurality of data elements satisfies the one or more data access rules by processing each of the first plurality of data elements using a second set of one or more trained machine learning models. Additionally, upon determining that each data element of a first set of data elements, from the first plurality of data elements, individually satisfies the one or more data access rules, the analysis server determines whether the first set of data elements collectively satisfies the one or more data access rules by processing the first set of data elements using a third set of one or more trained machine learning models at block 825. At block 830, upon determining that the first set of data elements satisfy the one or more data access rules, the analysis server generates a custom report including the first set of data elements.

Figure 9:
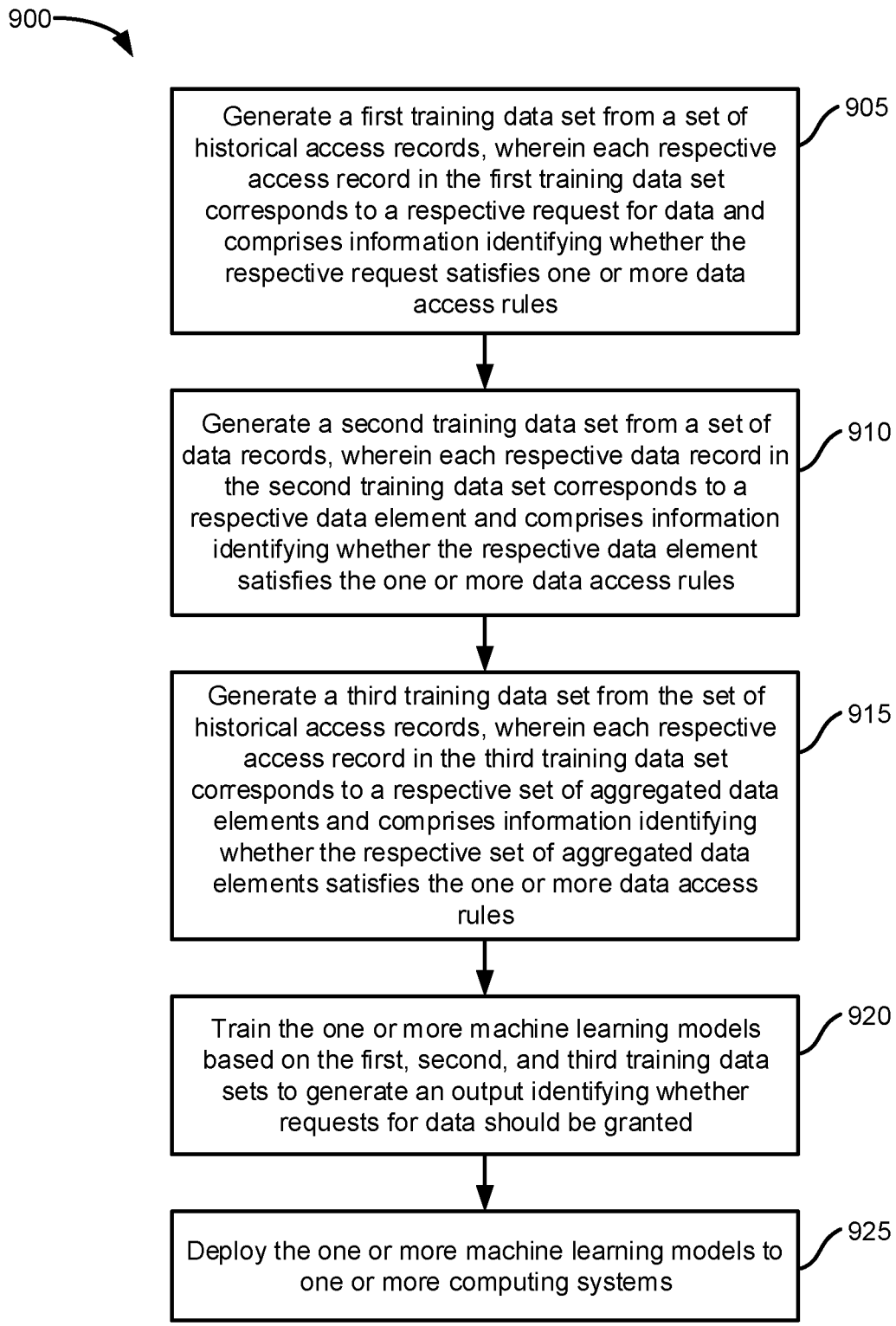
FIG. 9 is a flow diagram depicting a method for training one or more machine learning models to control data accessibility, according to some embodiments disclosed herein.

FIG. 9 is a flow diagram depicting a method 900 for training one or more machine learning models to control data accessibility, according to some embodiments disclosed herein. The method 900 begins at block 905, where a training server generates a first training data set from a set of historical access records, wherein each respective access record in the first training data set corresponds to a respective request for data and comprises information identifying whether the respective request satisfies one or more data access rules. At block 910, the training server generates a second training data set from a set of data records, wherein each respective data record in the second training data set corresponds to a respective data element and comprises information identifying whether the respective data element satisfies the one or more data access rules. Additionally, at block 915, the training server generates a third training data set from the set of historical access records, wherein each respective access record in the third training data set corresponds to a respective set of aggregated data elements and comprises information identifying whether the respective set of aggregated data elements satisfies the one or more data access rules. The method 900 then continues to block 920, where the training server trains the one or more machine learning models based on the first, second, and third training data sets to generate an output identifying whether requests for data should be granted. At block 925, the training server then deploys the one or more machine learning models to one or more computing systems.

Figure 10:
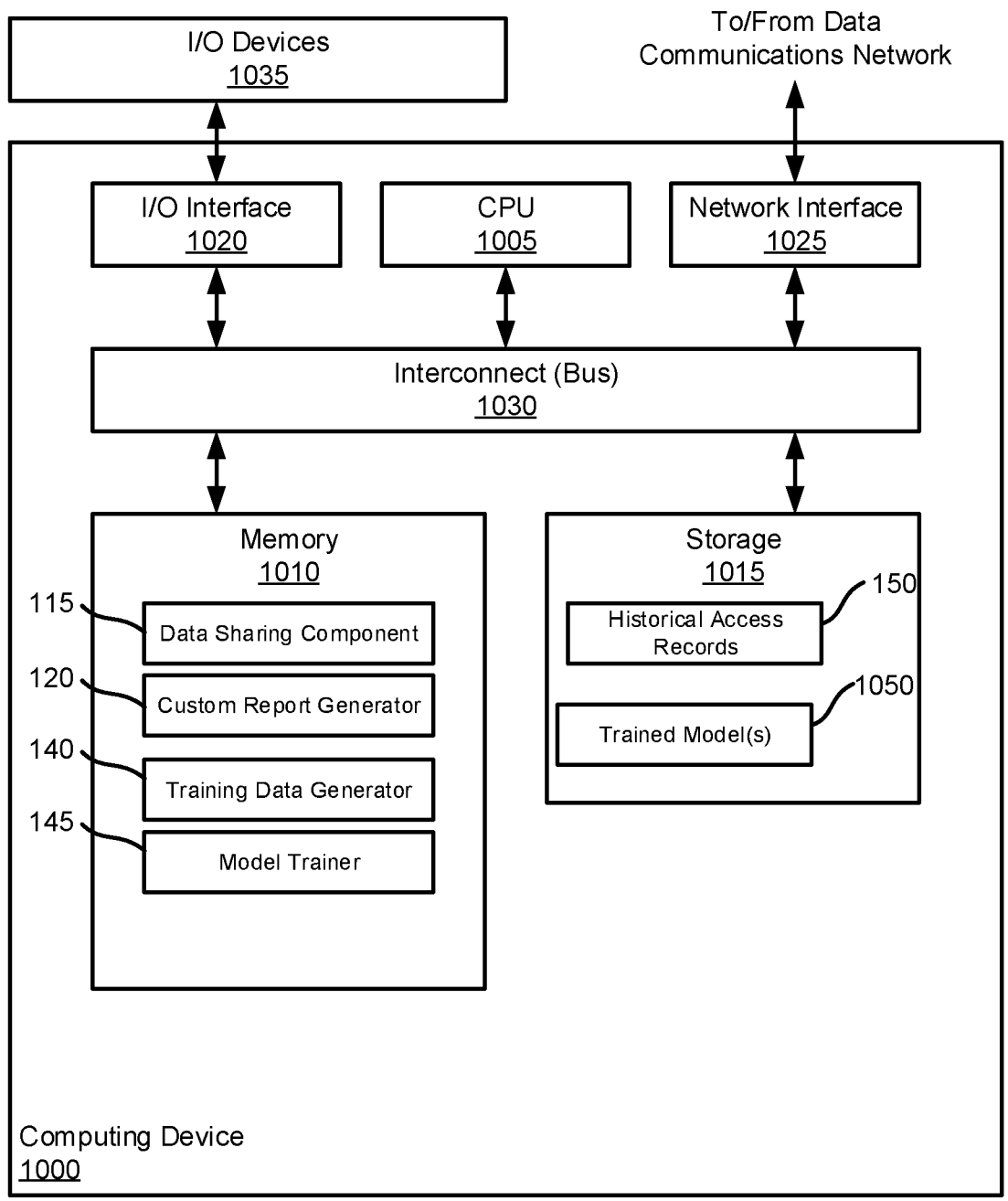
FIG. 10 is a block diagram depicting a computing device configured to train and use machine learning models to control data access, according to some embodiments disclosed herein.

Example System for Training and Using Machine Learning Models to Control Data Access FIG. 10 is a block diagram depicting a computing device 1000 configured to train and use machine learning models to control data access, according to some embodiments disclosed herein. For example, computing device 1000 may comprise one or more of the analysis server 110 and/or training server 135 illustrated in FIG. 1. The computing device 1000 may be configured to perform various techniques disclosed herein, such as the methods and techniques described in reference to FIGS. 2-9.

As shown, computing device 1000 includes a central processing unit (CPU) 1005, one or more I/O device interfaces 1020 that may allow for the connection of various I/O devices 1035 (e.g., keyboards, displays, mouse devices, pen input, etc.) to the computing device 1000, network interface 1025 through which computing device 1000 may be connected to one or more networks (which may include local networks, an intranet, the Internet, or any other group of computing devices communicatively connected to each other), a memory 1010, storage 1015, and an interconnect 1030.

CPU 1005 may retrieve and execute programming instructions stored in the memory 1010. Similarly, the CPU 1005 may retrieve and store application data residing in the memory 1010. The interconnect 1030 transmits programming instructions and application data, among the CPU 1005, I/O device interface 1020, network interface 1025, memory 1010, and storage 1015.

CPU 1005 is included to be representative of a single CPU, multiple CPUs, a single CPU having multiple processing cores, and the like.

Memory 1010 is representative of a volatile memory, such as a random access memory, or a nonvolatile memory, such as nonvolatile random access memory, phase change random access memory, or the like. As shown, memory 1010 includes a data sharing component 115, custom report generator 120, training data generator 140, and model trainer 145.

The data sharing component 115 is generally configured to evaluate requests and data elements in order to determine whether they should be shared (e.g., whether access should be granted to the requesting entity). In embodiments, the data sharing component 115 does so in part based on a set of access rules defining ethical and acceptable data security and access practices. In some embodiments, the data sharing component 115 utilizes machine learning models that have been trained on historical access records 150.

The custom report generator 120 generally generates data reports based on the decisions returned by the data sharing component 115. That is, the custom report generator 120 generates a report including any data elements which were approved (individually and in the aggregate) for sharing. In some embodiments, for any data that was excluded, the custom report generator 120 can include an indication as to which rule(s) the element(s) failed to satisfy (e.g., based on the particular model that classified the data element as failing).

The training data generator 140 generally generates training data sets from the historical access records. Each record in the training data sets indicates a set of input features (of the corresponding historical request or data element(s)), as well as a target output label (e.g., whether the historical request or data element(s) satisfied the access rules).

The model trainer 145 generally uses the training data sets to train a set of trained model(s) 1050, which are used by the data sharing component 115 to drive data access decisions.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for using one or more machine learning models to automatically control data access, comprising:
  receiving, from a first user, a first request for data relating to a second user;

automatically determining whether the first request satisfies one or more data access rules by processing the first request using a first set of one or more trained machine learning models;

upon determining that the first request satisfies the one or more data access rules, automatically retrieving a first plurality of data elements based on the first request;

automatically determining whether each of the first plurality of data elements satisfies the one or more data access rules by processing each of the first plurality of data elements individually using a second set of one or more trained machine learning models;

upon determining that each data element of a first set of data elements, from the first plurality of data elements, individually satisfies the one or more data access rules, determining whether the first set of data elements collectively satisfies the one or more data access rules by processing the first set of data elements using a third set of one or more trained machine learning models;

upon determining that the first set of data elements satisfy the one or more data access rules, generating a custom report including the first set of data elements;

receiving a second request;

automatically retrieving a second plurality of data elements based on the second request;

automatically determining that a second set of data elements, from the second plurality of data elements, satisfies the one or more data access rules by processing each of the second plurality of data elements using the second set of one or more trained machine learning models;

determining whether the second set of data elements collectively satisfy the one or more data access rules by processing the second set of data elements using the third set of one or more trained machine learning models; and upon determining that the second set of data elements collectively do not satisfy the one or more data access rules, refraining from providing at least one data element from the second set of data elements.

2. The method of claim 1, further comprising:
receiving a second request;
determining whether the second request satisfies the one or more data access rules by processing the second request using the first set of one or more trained machine learning models; and
upon determining that the second request does not satisfy the one or more data access rules, refraining from retrieving data for the second request.

3. The method of claim 1, further comprising:
upon determining that a second set of data elements, from the first plurality of data elements, does not satisfy the one or more data access rules, refraining from providing the second set of data elements.

4. The method of claim 1, further comprising:
transmitting, to the second user, a notification that the first set of data elements was accessed by the first user.

5. The method of claim 1, further comprising:
receiving a second request;
determining that the second request does not satisfy the one or more data access rules; and
generating custom report specifying a reason that the second request was denied.

6. The method of claim 1, wherein:
the first set of the one or more trained machine learning models includes:

a first machine learning model trained based on a first training data set and a first rule of the one or more data access rules;
a second machine learning model trained based on the first training data set and a second rule of the one or more data access rules; and
a third machine learning model trained based on the first training data set and a third rule of the one or more data access rules;
the second set of the one or more trained machine learning models includes:
a fourth machine learning model trained based on a second training data set and the first rule;
a fifth machine learning model trained based on the second training data set and the second rule; and
a sixth machine learning model trained based on the second training data set and the third rule; and
the third set of the one or more trained machine learning models includes:
a seventh machine learning model trained based on a third training data set and the first rule;
an eighth machine learning model trained based on the third training data set and the second rule; and
a ninth machine learning model trained based on the third training data set and the third rule.

7. The method of claim 6, wherein:
the first rule specifies that data can be accessed only if doing so would improve humanity,
the second rule specifies that data can be accessed only if an intended use of the data is legitimate, and
the third rule specifies that data can be accessed only if it remains protected.

8. One or more non-transitory computer-readable media containing instructions which, when executed by one or more processors, cause a system to perform one or more operations, the operations comprising:
receiving, from a first user, a first request for data relating to a second user;
automatically determining whether the first request satisfies one or more data access rules by processing the first request using a first set of one or more trained machine learning models;
upon determining that the first request satisfies the one or more data access rules, automatically retrieving a first plurality of data elements based on the first request;
automatically determining whether each of the first plurality of data elements satisfies the one or more data access rules by processing each of the first plurality of data elements individually using a second set of one or more trained machine learning models;
upon determining that each data element of a first set of data elements, from the first plurality of data elements, individually satisfies the one or more data access rules, determining whether the first set of data elements collectively satisfies the one or more data access rules by processing the first set of data elements using a third set of one or more trained machine learning models;
upon determining that the first set of data elements satisfy the one or more data access rules, generating a custom report including the first set of data elements;
receiving a second request;
automatically retrieving a second plurality of data elements based on the second request;
automatically determining that a second set of data elements, from the second plurality of data elements, satisfies the one or more data access rules by processing each of the second plurality of data elements using the second set of one or more trained machine learning models;
determining whether the second set of data elements collectively satisfy the one or more data access rules by processing the second set of data elements using the third set of one or more trained machine learning models; and
upon determining that the second set of data elements collectively do not satisfy the one or more data access rules, refraining from providing at least one data element from the second set of data elements.

9. The non-transitory computer-readable media of claim 8, wherein the operations further comprise:
receiving a second request;
determining whether the second request satisfies the one or more data access rules by processing the second request using the first set of one or more trained machine learning models; and
upon determining that the second request does not satisfy the one or more data access rules, refraining from retrieving data for the second request.

10. The non-transitory computer-readable media of claim 8, wherein the operations further comprise:
upon determining that a second set of data elements, from the first plurality of data elements, does not satisfy the one or more data access rules, refraining from providing the second set of data elements.

11. The non-transitory computer-readable media of claim 8, wherein the operations further comprise:
transmitting, to the second user, a notification that the first set of data elements was accessed by the first user.

12. The non-transitory computer-readable media of claim 8, wherein the operations further comprise:
receiving a second request;
determining that the second request does not satisfy the one or more data access rules; and
generating custom report specifying a reason that the second request was denied.

13. The non-transitory computer-readable media of claim 8, wherein:
the first set of the one or more trained machine learning models includes:
a first machine learning model trained based on a first training data set and a first rule of the one or more data access rules;
a second machine learning model trained based on the first training data set and a second rule of the one or more data access rules; and
a third machine learning model trained based on the first training data set and a third rule of the one or more data access rules;
the second set of the one or more trained machine learning models includes:
a fourth machine learning model trained based on a second training data set and the first rule;
a fifth machine learning model trained based on the second training data set and the second rule; and
a sixth machine learning model trained based on the second training data set and the third rule; and
the third set of the one or more trained machine learning models includes:
a seventh machine learning model trained based on a third training data set and the first rule;
an eighth machine learning model trained based on the third training data set and the second rule; and
a ninth machine learning model trained based on the third training data set and the third rule.

14. The non-transitory computer-readable media of claim 13, wherein:
the first rule specifies that data can be accessed only if doing so would improve humanity,
the second rule specifies that data can be accessed only if an intended use of the data is legitimate, and
the third rule specifies that data can be accessed only if it remains protected.

15. A system, comprising:
one or more processors, and
one or more non-transitory computer-readable media containing instructions which, when executed by the one or more processors, cause the system to perform one or more operations, the operations comprising:
receiving, from a first user, a first request for data relating to a second user;
automatically determining whether the first request satisfies one or more data access rules by processing the first request using a first set of one or more trained machine learning models;
upon determining that the first request satisfies the one or more data access rules, automatically retrieving a first plurality of data elements based on the first request;
automatically determining whether each of the first plurality of data elements satisfies the one or more data access rules by processing each of the first plurality of data elements individually using a second set of one or more trained machine learning models;
upon determining that each data element of a first set of data elements, from the first plurality of data elements, individually satisfies the one or more data access rules, determining whether the first set of data elements collectively satisfies the one or more data access rules by processing the first set of data elements using a third set of one or more trained machine learning models; and
upon determining that the first set of data elements satisfy the one or more data access rules, generating a custom report including the first set of data elements, wherein
the first set of the one or more trained machine learning models includes:
a first machine learning model trained based on a first training data set and a first rule of the one or more data access rules;
a second machine learning model trained based on the first training data set and a second rule of the one or more data access rules; and
a third machine learning model trained based on the first training data set and a third rule of the one or more data access rules;
the second set of the one or more trained machine learning models includes:
a fourth machine learning model trained based on a second training data set and the first rule;
a fifth machine learning model trained based on the second training data set and the second rule; and
a sixth machine learning model trained based on the second training data set and the third rule; and
the third set of the one or more trained machine learning models includes:
a seventh machine learning model trained based on a third training data set and the first rule;

an eighth machine learning model trained based on the third training data set and the second rule; and a ninth machine learning model trained based on the third training data set and the third rule.

16. The system of claim 15, wherein the operations further comprise:

receiving a second request;

determining whether the second request satisfies the one or more data access rules by processing the second request using the first set of one or more trained machine learning models; and upon determining that the second request does not satisfy the one or more data access rules, refraining from retrieving data for the second request.

17. The system of claim 15, wherein the operations further comprise:

upon determining that a second set of data elements, from the first plurality of data elements, does not satisfy the one or more data access rules, refraining from providing the second set of data elements.

* * * * *